United States Patent Office 3,297,647
Patented Jan. 10, 1967

3,297,647
PRODUCT AND PROCESS FOR THE MANUFACTURE OF LINEAR TERPOLYMERS OF ACETALS
Claus Schott and Hans Dieter Hermann, Hofheim (Taunus), and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 29, 1963, Ser. No. 276,186
Claims priority, application Germany, Apr. 28, 1962, F 36,664
12 Claims. (Cl. 260—73)

The present invention relates to a process for the manufacture of copolymers of acetals.

It is known that polyoxymethylenes of high molecular weight which are suitable for the manufacture of plastics can be obtained by anionic polymerization of formaldehyde or cationic polymerization of trioxane, the cyclic trimer of formaldehyde. Homopolymer polyoxymethylene constitutes a polyacetal with unstable terminal hemiformal groups. It is thermally decomposed, except for a small proportion, by a so-called unzipping reaction in which monomer formaldehyde is formed. In this reaction, a new unstable terminal hemiformal group is formed at the macromolecule on the degradation of a hemiformal molecule.

To convert such polyoxymethylenes with terminal hemiformal groups into technically useful plastics it is necessary to stabilize, for example esterify, the terminal groups. For this purpose, the polymer may be dissolved at 160° C., for example, in acetic anhydride. After the esterification, the excess of acetic anhydride and the acetic acid formed must be removed from the polymer by complicated purifying processes. Moreover, the polymers thus stabilized are unstable towards alkalies owing to the danger of saponification. Furthermore, when a molecule chain which has been stabilized by esterification of the terminal groups is thermally split in the interior part of the chain, an unzipping reaction sets in.

The latter applies also to products with etherified terminal groups. When the terminal groups are etherified it is, moreover, difficult to adjust the polymer to a desired molecular weight.

More favourable results in the stabilization of polyoxymethylenes are obtained by copolymerizing trioxane, for example, with saturated cyclic ethers or cyclic formals such as, for example, ethylene oxide or diethylene glycol formal.

To stabilize the polymers, the unstable terminal groups are decomposed by hydrolysis after the polymerization, the unzipping reaction stopping at the comonomer molecules. When a molecule chain is thermally split in the processing of the polymer, the decomposition of the chain stops at the next comonomer molecule so that an improved thermostability is obtained.

As catalysts for the manufacture of the above mentioned copolymers, boron fluoride or its derivatives, for example etherates, or diazonium fluoroborates are advantageously used.

Copolymers of acetals, particularly copolymers having a high content of polyoxymethylene units of high molecular weight and high stability, are successfully used for the manufacture of injection moulded or extruded articles of plastics material, which articles may, for example, also be used at elevated temperatures.

The polymers are distinguished particularly by a high hardness and good toughness. It is difficult to modify the properties of the polymers so as to obtain a lower hardness, higher toughness and higher elasticity, for example by using a higher proportion of cyclic ethers or cyclic formals in the copolymerization of trioxane.

Now we have found that linear terpolymers based on trioxane which have particularly valuable properties can be obtained by copolymerizing trioxane with a cyclic ether, for example ethylene oxide, propylene oxide, phenoxypropene oxide, epichlorhydrin or bis-chloromethyloxetane, and/or a saturated cyclic formal, for example dioxolane or diethylene glycol formal, and a formal of an unsaturated diol having advantageously 4 to 8 carbon atoms, which may be substituted, if desired, by side chains of aliphatic hydrocarbons with 1 to 4 carbon atoms. As formal of an unsaturated diol there may be used, for example, the formal of butene(2)-1,4-diol, hexene(2)-1,4-diol or 2-ethylbutene(2)-1,4-diol, preferably butene(2)-1,4-diol-formal.

The process of the invention yields new linear terpolymers having a C=C double bond in the principal valence chain. The cyclic ether or saturated cyclic formal is advantageously used in an amount of 0.1 to 59.9% by weight, calculated on the total monomer mixture. The formal of the unsaturated diol is advantageously used in an amount of 59.9 to 0.1% by weight, calculated on the total monomer mixture. The trioxane is advantageously used in an amount of 40 to 99.8% by weight, calculated on the total monomer mixture.

The physical properties of the terpolymers can be varied within wide limits and depend, on the one hand, on the nature and concentration of the saturated cyclic formal or saturated cyclic ether and, on the other hand, on the concentration of the formal of an unsaturated cyclic diol.

For example, when 0.1 to 10% by weight, calculated on the total monomer mixture, of unsaturated cyclic formal and 0.1 to 10% by weight, calculated on the total monomer mixture, of saturated cyclic formal or ether are used, highly crystalline products are obtained, whereas with 40 to 59.9% by weight, calculated on the total monomer mixture of unsaturated cyclic formal or ether, amorphous elastic, glass-clear products are obtained. The more voluminous the second comonomer, the lower is the crystallinity and the higher is the elasticity. The decrease in crystallinity can be well measured by means of X-rays.

Low molecular weight terpolymers which constitute waxes or oils can easily be obtained with the use of high concentrations of catalyst, that is about 0.1 to 1% by weight, calculated on the total monomer mixture.

The above statements are intended to indicate the wide limits within which the properties of the terpolymers obtained by the process of the invention may be varied, the incorporation of different comonomers having, of course, different effects on the properties of the terpolymers and the transitions being fluid.

Very interesting properties are imparted to the terpolymers of the invention by the double bonds contained in the main chain, which double bonds enable the terpolymers to be cross-linked by known methods. For example, the terpolymers may be vulcanized by kneading with sulfur.

The polymerization may be carried out according to known methods in bulk, solution or suspension. As solvents there may advantageously be used aliphatic hydrocarbons with 6 to 18 carbon atoms, mononuclear aromatic hydrocarbons which may be mono- or bisubstituted by aliphatic hydrocarbons with 1 or 2 carbon atoms, aliphatic halogenated hydrocarbons, advantageously chlorinated or fluorinated aliphatic hydrocarbons, especially those with 1 to 4 carbon atoms, or aliphatic ethers with 2 to 4 carbon atoms. The polymerization in bulk takes a particularly smooth course.

The polymerization is advantageously carried out at temperatures at which trioxane does not crystallize out, that is depending on the solvent used at a temperature within the range of —50 to +100° C. and in the absence of solvent at a temperature within the range of +20 to +100° C., advantageously +60 to +80° C.

As catalysts all substances may be used which are capable of initiating a cationic polymerization, for example organic or inorganic acids, acid halides and advantageously Lewis acids (for the definition of Lewis acids cf. "Lehrbuch der Elektrochemie" by Kortum, Wiesbaden 1948, pages 300/301). Of the latter, boron fluoride and its complex compounds, and particularly etherates of boron fluoride, are advantageously used. Diazonium fluoroborates are also very suitable. In principle, however, all known cationic catalysts may be used, for example those obtained by the process of U.S. patent application Serial No. 860,739 filed December 21, 1959.

The concentration of the catalyst may vary within wide limits. It depends on the nature of the catalyst and on whether it is intended to obtain high molecular weight or low molecular weight copolymers. The concentration of the catalyst may be within the range of 0.0001 and 1% by weight, calculated on the total monomer mixture, and is generally within the range of 0.001 to 0.1% by weight.

Since, particularly in the presence of moisture, the catalyst tends to decompose the polymer, the catalyst is advantageously neutralized immediately after the polymerization, for example with ammonia or solutions of primary, secondary or tertiary amines in methanol or acetone, advantageously with solutions of mono-, di- or triethanol amine in aliphatic hydrocarbons having 1 to 4 carbon atoms.

The unstable terminal hemiacetal groups may be removed, in known manner, from other copolymers. Advantageously, the polymer is suspended in aqueous ammonia at temperatures within the range of 100 to 200° C., if desired in the presence of a swelling agent such as methanol or n-propanol. Alternatively, the polymer is dissolved in an alkaline medium at temperatures of above 100° C. and subsequently reprecipitated. Exemplary of suitable solvents are benzyl alcohol, ethylene glycol monoethyl ether and a mixture of 60% methanol and 40% water. Examples of suitable alkalies are ammonia and aliphatic amines.

It is also possible to stabilize the terminal groups in the absence of a solvent in the melt in the presence of a stabilizer, advantageously at temperatures within the range of 160 to 200° C.

The polymer may be stabilized against the action of heat, light and oxygen in the same manner as the known trioxane copolymers. Exemplary of heat stabilizers are polyamides, amides of polybasic carboxylic acids, amidines and urea compounds. Exemplary of stabilizers against oxidation are phenols, advantageously bisphenols and aromatic amines. As light stabilizers alphaoxybenzophenone derivatives may be used.

The above terpolymers have a wide range of application. The high molecular weight polymers having a high content of trioxane may be used for making films, fibers or injection molded or extruded articles. The high molecular weight polymers having a low content of trioxane may be used, if desired, after vulcanization, for making rubber-elastic films, fibers and shaped articles. Depending on the molecular weight, the low molecular weight terpolymers may be used as lubricants, waxes or thermoplastic adhesives, advantageously as adhesives for leather or textiles.

The following examples serve to illustrate the invention but they are not intended to limit it thereto, the parts being by weight.

*Example 1*

88 grams liquid, freshly distilled trioxane, 10 g. butene-diol-formal and 2 g. ethylene oxide were introduced into a screw-top glass bottle. Then 0.04 cc. boron fluoride diethyl etherate was added from an injection syringe. The glass bottle was closed and introduced into a water bath at 70° C. The reaction mixture acquired a dark green color and became viscous. After about 10 minutes the glass block became translucent. The glass was left on the water bath for 1 hour before it was broken. The comminuted terpolymer was treated with triethanol amine, during which process the green color disappeared. By subjecting the product at 150° C. for 1 hour to a homogeneous hydrolysis in benzyl alcohol in the presence of 1% of amine and extracting the benzyl alcohol with methanol, a white to yellow-white powder was obtained. The yield amounted to 48 g. The terpolymer had a value $\eta$ red. of 1.23 (determined at 140° C. on a 0.5% solution of the terpolymer in butyrolactone stabilized with 2% of diphenyl amine).

*Example 2*

97 parts liquid trioxane, 2 parts ethylene oxide and 1 part butene-diol-formal were introduced into a screw-top glass bottle and mixed thoroughly. Then 0.015 part paranitrophenyl diazonium fluoroborate was added to polymerize the batch, while heating by a water bath at 70° C. The polymer was worked up as described above. The yield amounted to 84%. The terpolymer had a value $\eta$ red. of 0.78. To examine the thermostability of the product, 5 g. polymer were mixed with 35 mg. 2,2-methylene-bis-4-methyl-6-tert.-butylphenol and 10 mg. dicyan diamide and the product thus stabilized was heated for 45 minutes at 230° C. in an aluminum block in air. In this test, the product lost 0.02% of its weight per minute.

*Example 3*

80 g. liquid trioxane, 16 g. butene-diol-formal and 6 g. ethylene oxide were introduced into a reaction vessel of refined steel which ensured a particularly good heat dissipation. 0.08 cc. boron fluoride diethyl etherate was then injected into the reaction mixture. After the polymerization, the polymer was worked up in the manner described above. The crystallinity as determined by means of X-rays amounted to 64% of that of the pure homopolymer of trioxane. In the infra-red spectrum a strong band which belonged to butene-diol-formal appeared at 7.41 $\mu$. From the intensity of the band it could be calculated that the terpolymer contained 18.4% of butene-diol-formal incorporated by the polymerization.

*Example 4*

85 cc. liquid trioxane, 10 cc. butene-diol-formal and 5 cc. diethylene glycol formal were copolymerized at 70° C. with 0.08 cc. boron fluoride diethyl etherate. The reaction time amounted to about 1 hour. After the polymer had been treated with methanol and 1% of amine the yield amounted to 71 g. and after the homogeneous hydrolysis in benzyl alcohol/triethanol amine to 64 g. The product had a value of $\eta$ red. of 0.55. When the thermostability of the product was examined in the manner described in Example 2, the product lost 0.02% of its weight per minute.

*Example 5*

In the manner described above 100 parts liquid trioxane, 20 parts butene-diol-formal and 2 parts propylene oxide were copolymerized at 50° C. with 0.06 part boron fluoride etherate. The reaction time amounted to about 6 hours. When the thermostability of the product was examined in the manner described in Example 2, the product lost 0.02% of its weight per minute.

*Example 6*

88 g. trioxane, 10 g. butene-diol-formal and 2 g. phenoxypropene oxide were copolymerized with 0.06 cc. boron fluoride etherate. The yield amounted to 51%. When the thermostability of the product was examined in the manner described in Example 2, the product lost 0.02% of its weight per minute.

Example 7

0.018 part gaseous boron fluoride was added under nitrogen to 5 parts butene(2)-diol-1,4-formal, 20 parts epichlorhydrin and 75 parts trioxane. After 5 hours at 55° C. the mixture had solidified to form a solid block. After a further 10 hours the polymer was boiled with methanol containing 1% of tributylamine. 50 parts of a white, tough polymer were obtained. 20 g. of the polymer were dissolved in 10 times the amount of benzyl alcohol containing 2% of triethanol amine and the whole was kept at 180° C. for 30 minutes. After cooling, the batch was poured in methanol. The polymer which had separated was suction-filtered and washed thoroughly with methanol. By drying, 19.4 g. of elastic terpolymer having stable terminal groups were obtained. As determined by chlorine analysis and in the infra-red spectrum the product contained 26.6% epichlorhydrin and 5.7% butene(2)-diol-1,4-formal incorporated by the polymerization.

Example 8

Into a mixture of 5 cc. butene(2)-diol-1,4-formal, 1 cc. epichlorhydrin and 44 cc. trioxane, 1.0 cc. boronfluoride was introduced at 70° C. with the exclusion of air. After 30 minutes the polymer which had been formed was comminuted and boiled with a 1% aqueous ammonia solution. The polymer was then washed with methanol and dried. A very tough polymer having a softening point of 155° C. was obtained in a yield of 94%.

We claim:

1. A process for the manufacture of linear terpolymers, which comprises polymerizing 40 to 99.8% by weight, calculated on the whole monomer mixture, of trioxane, 59.9 to 0.1% by weight, calculated on the whole monomer mixture, of a formal of an unsaturated dihydric alcohol with 4 to 8 carbon atoms and 0.1 to 59.9% by weight, calculated on the whole monomer mixture, of at least one cyclic ether selected from the group consisting of ethylene oxide, propylene oxide, phenoxypropene oxide, epichlorhydrin and bis-chloromethyl-oxetane, in admixture with 0.0001 to 1% by weight, calculated on the whole monomer mixture, of a cationic catalyst at a temperature within the range of −50° C. and +100° C.

2. A process for the manufacture of linear terpolymers, which comprises polymerizing 40 to 99.8% by weight, calculated on the whole monomer mixture, of trioxane, 59.9 to 0.1% by weight, calculated on the whole monomer mixture, of a formal of an unsaturated dihydric alcohol with 4 to 8 carbon atoms and 0.1 to 59.9% by weight, calculated on the whole monomer mixture, of a saturated cyclic formal selected from the group consisting of dioxolane and diethylene glycol formal in admixture with 0.0001 to 1% by weight, calculated on the whole monomer mixture, of a cationic catalyst at a temperature within the range of −50° C. and +100° C.

3. The process of claim 1, wherein said cationic catalyst is selected from the group consisting of boron fluoride, etherates, and diazonium fluoroborates.

4. The process of claim 1, wherein said formal of an unsaturated dihydric alcohol is selected from the group consisting of butene(2)-1,4-diol formal, hexene(2)-1,4-diol formal and 2-ethylbutene(2)-1,4-diol formal.

5. Linear terpolymer having a C=C double bond in the principal valence chain and consisting of recurring units of 40 to 99.8% by weight, calculated on the whole monomer mixture, of trioxane, 59.9 to 0.1% by weight, calculated on the whole monomer mixture, of a formal of an unsaturated dihydric alcohol with 4 to 8 carbon atoms, and 0.1 to 59.9% by weight, calculated on the whole monomer mixture, of at least one cyclic ether, selected from the group consisting of ethylene oxide, propylene oxide, phenoxypropene oxide, epichlorhydrin and bis-chloromethyloxetane.

6. Linear terpolymer having a C=C double bond in the principal valence chain and consisting of recurring units of 40 to 99.8% by weight, calculated on the whole monomer mixture, of trioxane, 59.9 to 0.1% by weight, calculated on the whole monomer mixture, of a formal of an unsaturated dihydric alcohol with 4 to 8 carbon atoms, and 0.1 to 59.9% by weight, calculated on the whole monomer mixture, of a saturated cyclic formal selected from the group consisting of dioxolane and diethylene glycol formal.

7. Linear terpolymer according to claim 5 wherein said formal of an unsaturated dihydric alcohol is selected from the group consisting of butene(2)-1,4-diol formal, hexene(2)-1,4-diol formal and 2-ethylbutene(2)-1,4-diol formal.

8. Linear terpolymer as defined in claim 5, wherein the formal is butene(2)-1,4-diol formal and the cyclic ether is ethylene oxide.

9. Linear terpolymer as defined in claim 5, wherein the formal is butene(2)-1,4-diol formal and the cyclic ether is propylene oxide.

10. Linear terpolymer as defined in claim 5, wherein the formal is butene(2)-1,4-diol formal and the cyclic ether is phenoxy-propene oxide.

11. Linear terpolymer as defined in claim 5, wherein the formal is butene(2)-1,4-diol formal and the cyclic ether is epichlorohydrin.

12. Linear terpolymers as defined in claim 6, wherein the formal of an unsaturated dihydric alcohol is butene(2)-1,4-diol formal and the saturated cyclic formal is diethylene glycol formal.

References Cited by the Examiner

UNITED STATES PATENTS

| | | | |
|---|---|---|---|
| 2,350,350 | 6/1944 | Gresham | 260—67 |
| 2,394,910 | 2/1946 | Gresham | 260—2 |
| 2,870,097 | 1/1959 | Pattison | 260—2 |
| 3,027,352 | 3/1962 | Walling et al. | 260—67 |
| 3,112,280 | 11/1963 | Farthing | 260—2 |
| 3,133,896 | 5/1964 | Dolce et al. | 260—67 |
| 3,218,295 | 11/1965 | Cline | 260—67 |
| 3,219,631 | 11/1965 | Kullmar et al. | 260—67 |

FOREIGN PATENTS

| | | |
|---|---|---|
| 218,743 | 12/1961 | Austria. |
| 1,271,297 | 7/1931 | France. |

WILLIAM H. SHORT, *Primary Examiner.*

L. M. MILLER, *Assistant Examiner.*